United States Patent
Derango et al.

[11] Patent Number: 6,157,843
[45] Date of Patent: *Dec. 5, 2000

[54] METHOD FOR PRE-ESTABLISHING COMMUNICATIONS IN A WIRELESS COMMUNICATION NETWORK WITHOUT THE USE OF A MULTICAST SERVER

[75] Inventors: Mario F. Derango, Schaumburg; John W. Maher, Woodstock; Russell A. Marten, Schaumburg, all of Ill.

[73] Assignee: Motorola, Inc., Schaumburg, Ill.

[*] Notice: This patent is subject to a terminal disclaimer.

[21] Appl. No.: 08/656,459

[22] Filed: May 31, 1996

[51] Int. Cl.⁷ ........................ H04Q 7/20
[52] U.S. Cl. .............. 455/518; 455/520; 455/525; 370/312
[58] Field of Search ............ 455/517, 518, 455/519, 520, 524, 525; 370/312, 338, 390

[56] References Cited

U.S. PATENT DOCUMENTS

| | | | |
|---|---|---|---|
| 5,301,357 | 4/1994 | Thompson | 455/517 |
| 5,465,391 | 11/1995 | Toyryla | 455/518 |
| 5,491,835 | 2/1996 | Sasuta et al. | 455/518 |
| 5,761,193 | 6/1998 | Derango et al. | 455/520 |
| 5,797,100 | 8/1998 | Dettner | 455/517 |
| 5,930,723 | 7/1999 | Heiskari et al. | 455/518 |

OTHER PUBLICATIONS

"Frame Relay PVC Multicast Service and Protocol Description" Frame Relay Forum. Implementation Agreement. Oct. 21, 1994. Ed. George Swallow–Lightstream. Tel.: (508) 262–1143. Fax: (508) 262–1111. Internet: swallow@lightstream.com.

*Primary Examiner*—Edward F. Urban
*Attorney, Agent, or Firm*—Steven R. Santema

[57] ABSTRACT

Network access delays are minimized by using affiliation messages to pre-establish communications in a wireless communication network (100). A controller (102), upon receiving an affiliation message from a first site (104), establishes connections between the first site and a second site (105), the connections being uniquely associated with a talkgroup/site affiliation indicated by the affiliation message. Additional sites can be added by modifying the connection to include the additional sites. Using a multicast SVC as the connection between the first and second site eliminates the need for a multicast server and its associated delays.

14 Claims, 3 Drawing Sheets

METHOD FOR PRE-ESTABLISHING COMMUNICATIONS IN A WIRELESS COMMUNICATION NETWORK WITHOUT THE USE OF A MULTICAST SERVER

FIELD OF THE INVENTION

The present invention relates generally to wireless communication networks and, in particular, to a method for pre-establishing communications therein without the use of a multicast server.

BACKGROUND OF THE INVENTION

Wireless communication networks in which a plurality of wireless communication sites (or zones) are operably coupled to each other via a packet network are known. Typically, the packet network will include a multicast server, the operation of which is described below. Wireless communication units, such as portable or mobile radios, can roam between the sites. A controller (also referred to as a zone controller) serves to coordinate communications between the sites. In this capacity, the controller maintains databases regarding talkgroup and site affiliations for the communication units, as well as performs call setup and resource allocation procedures, as known in the art.

When a communication unit roams within the coverage area of a site, it affiliates with that site, i.e., the communication unit alerts the site that it is now within the coverage area of the site by transmitting an affiliation message. Additionally, the communication unit, will notify the site of its unit identification (the particular identification assigned to that unit) and its talkgroup identification (the particular talkgroup with which the communication unit is currently affiliated). As known in the art, talkgroups are a logical grouping of communication units such that communications can be initiated and conducted on a group-wide basis.

Currently, when an operator of a communication unit attempts to communicate with other units in his or her talkgroup, they first transmit a communication request by depressing a push-to-talk (PTT) key. Upon receiving the communication request, the site in which the communication unit is currently operating forwards the communication request to the controller. In order to complete the group call, the controller determines whether other sites are needed to complete the group call.

Assuming that other sites are required to complete the group call, prior art systems sometimes required the controller, in response to the pending communication request, to establish connections, via the packet network, between a multicast server and the various sites to be included in the call. As known in the art, a multicast server takes as input packetized information (i.e., packets of voice and/or data communications) and destination addresses. The multicast server then copies the packetized information and routes the copies to each of the supplied destination addresses. To the extent that the destination addresses correspond to sites (or consoles), the multicast server implements the one-to-many functionality required for group calls.

Although widely used, multicast servers add complexity and delay to the setup of group calls. Currently, connections between a multicast server and a site are provided using so-called permanent virtual circuit (PVC) connections (statically created when the system is initialized or when the system is permanently modified) and/or switched virtual circuit (SVC) connections (implemented by creating, on demand, temporary routing addresses between switching nodes within a packet network).

However, the use of PVCs becomes increasingly impractical and complex as the number of sites within the communication system increases. Additionally, the destination addresses must be determined and provided to the multicast server prior to allowing a group call to proceed, thereby adding some delay to the setup of the group call. Additionally, in the case of SVCs, each switching node used to create a given SVC typically requires 1–30 ms. to establish the required temporary routing addresses and pass that information along to the next switching node. Because it is often likely that a given SVC will pass through multiple switching nodes, the delay incurred in its creation (in response to a communication request) can be on the order of hundreds of milliseconds.

Thus, before the communication request can be serviced, significant network delays are added to the delays already imposed by the sites and the controller. Given that access times are a significant factor in user perceptions of overall system quality, the need to keep system delays to a minimum is paramount. Therefore, it would be advantageous to provide a technique that allows connections within the packet network to be established such that additional delays are minimized. In particular, it would be most advantageous to eliminate the use, and additional delays, of a multicast server.

DESCRIPTION OF A PREFERRED EMBODIMENT

The present invention provides a method for pre-establishing communications within a wireless communication network such that the use, and additional delays, of a multicast server are substantially eliminated. The present invention make use of multicast-SVC capabilities; thus, connections between sites are not pre-assigned. A controller receives an affiliation message from a first site. The affiliation message, sourced by a first communication unit within the first site, indicates that a talkgroup corresponding to the first communication unit is affiliated with the first site. Responsive to the affiliation message, the controller establishes connections between the first site and the second site. If a subsequent affiliation message from a third site is forwarded to the controller indicating that the third site is affiliated with the talkgroup, the controller modifies the connection between the first site and the second site to include the third site. In this manner, connections between sites are established prior to a group call request, thereby minimizing overall system access delays.

Figure 1:
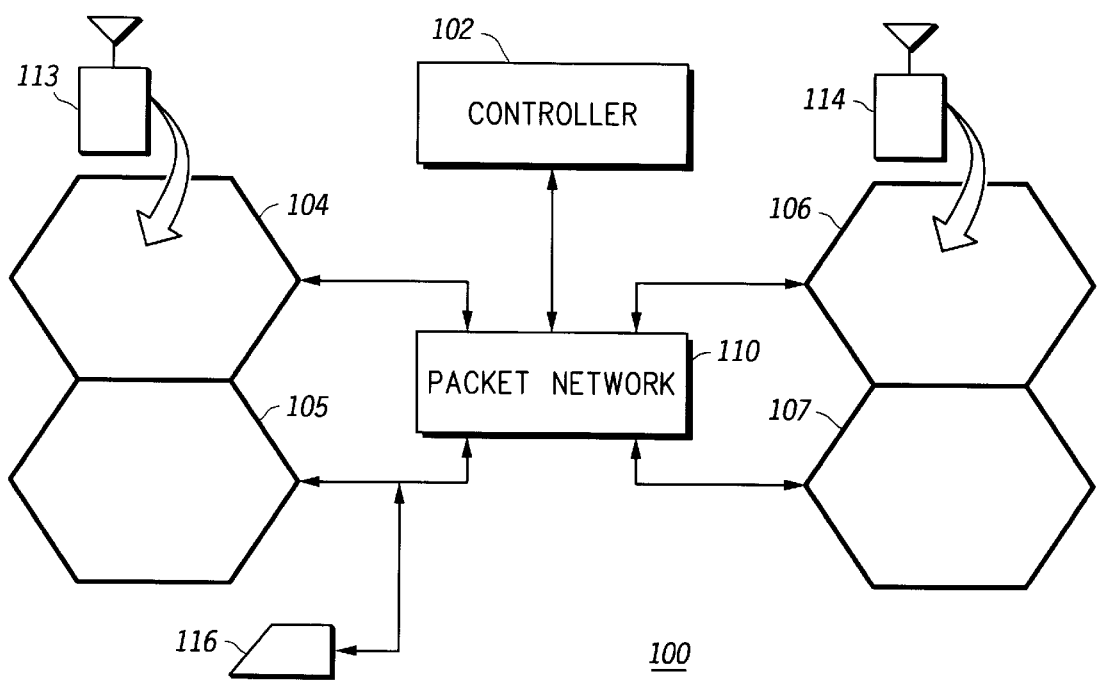
FIG. 1 is a block diagram of a wireless communication network.

The present invention can be more readily described with reference to FIGS. 1–3. FIG. 1 is a block diagram of a wireless communication network 100. The wireless communication network 100 comprises a plurality of wireless communication sites (or zones) 104–107 operably coupled to each other via a packet network 110. The packet network 110 may comprise a packet network operating in accordance with well-known protocols such as Frame Relay or Asynchronous Transfer Mode, or with proprietary protocols that provide similar functionality.

Wireless communication units 113–114, such as portable or mobile radios, can roam between the sites 104–107. Although not shown in detail, each of the sites 104–107 comprises, in practice, one or more base stations operating under the control of a site controller and in communication with the packet network 110 via a gateway. The site controller and the gateway could exist as independent devices, or could be incorporated into the same physical implementation. The gateway "receives" the connections with the packet network 110 and, based on information included in the payload of individual packets, logically establishes the connections between the packet network 110 and the individual base stations within the site.

Additionally, the wireless communication network 100 may include one or more operator positions 116 that perform dispatch operations. For the purposes of the present invention, each operator position 116 is treated similar to a communication unit. In practice, the operator positions 116 may be part of a console site in which a group of operator positions (consoles) are connected to the packet network 110 via a gateway, as described above. Alternatively, the operator positions 116 can exist as separate, individual entities connected directly to the packet network.

A controller 102 (zone controller) serves to coordinate communications between the sites 104–107. As described above, the controller 102 maintains databases regarding talkgroup and site affiliations for the communication units 113–114, as well as performs call setup and resource allocation procedures, as known in the art.

Rather than using SVC or PVC connections exclusively to link the sites 104–107 together, the present invention utilizes so-called multicast SVC connections. Details regarding multicast SVCs are described in the "ATM/UNI 3.1" specification promulgated by the ATM Forum. Additionally, multicast SVCs are discussed in the "Multicast Service And Protocol Description" published by the Frame Relay Forum. One of the primary advantages, at least from the perspective of the present invention, offered by multicast SVCs is that they eliminate the need for a multicast server. Rather than having a separate device to achieve the one-to-many functionality required for group calls, the present invention takes advantage of the one-to-many capabilities offered by multicast SVCs.

Figure 2:
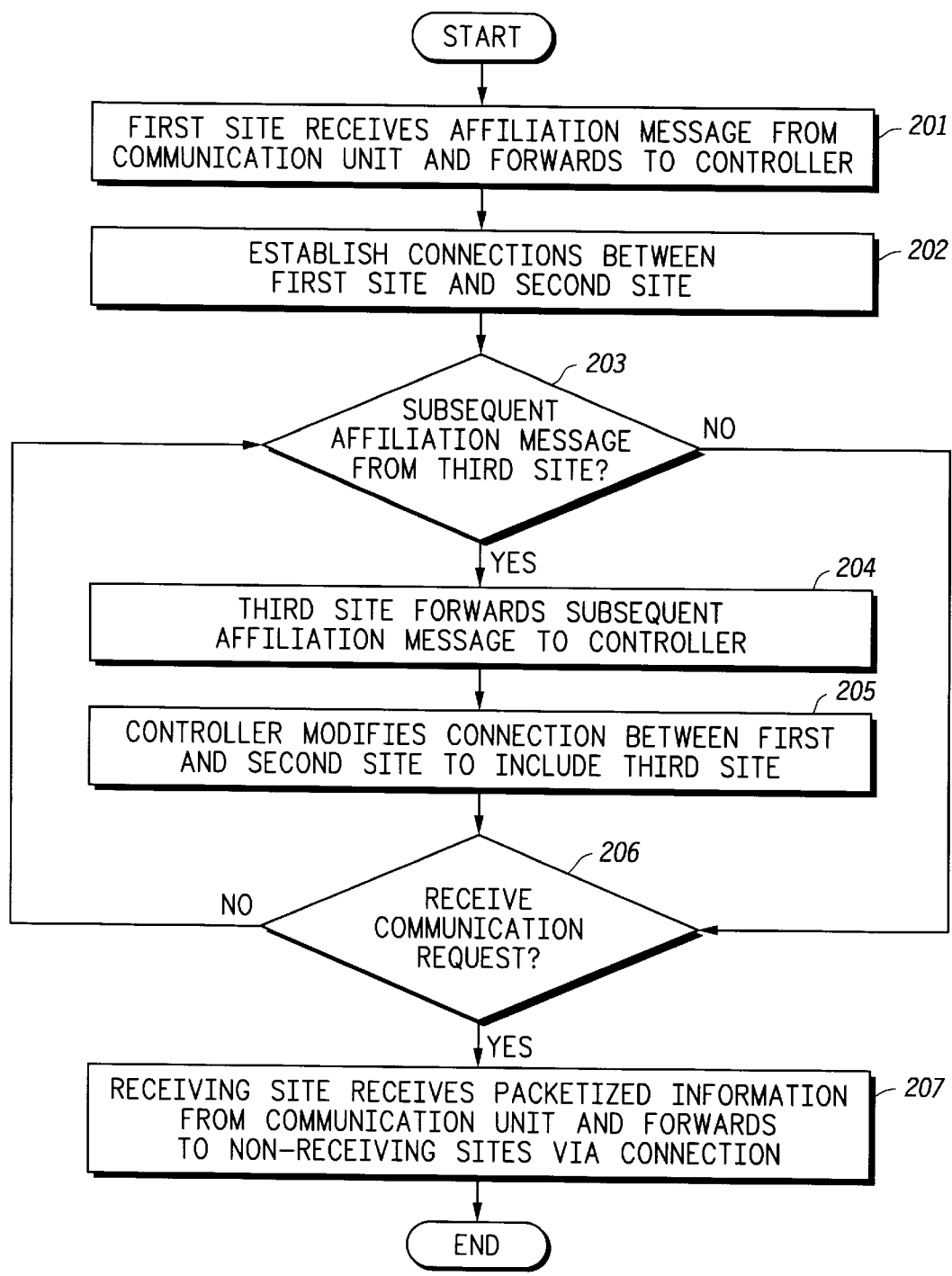
FIG. 2 is a flowchart illustrating a method for pre-establishing communications based on an affiliation message in a wireless communication network.

FIG. 2 is a flowchart illustrating a method for pre-establishing communications based on an affiliation message in a wireless communication network. In particular, the method described is designed for use where there are no pre-arranged connections between sites, but where multicast SVC connections can be established in accordance with known techniques. At step 201, a first site receives an affiliation message from a communication unit and forwards the affiliation message to a controller. As described above, the affiliation message alerts the site to the unit's presence within the coverage area of the site. Of equal importance, the affiliation message indicates that the talkgroup which the communication unit has currently selected (i.e., talkgroup that the unit is monitoring) is now also affiliated with the site. For example, in FIG. 1, a first communication unit 113 roams within the coverage area of a first site 104. In so doing, the first communication unit 113 informs the first site 104 of its unit ID and that it is currently affiliated with talkgroup "A", as hereinafter assumed. This information is then forwarded to the controller 102.

At step 202, responsive to the affiliation message forwarded at step 201, connections are established between the first site and a second site. In the preferred embodiment, the connections comprise multicast SVC connections, the establishment of which is well known in the art. Currently, multicast SVCs do not possess bidirectional capabilities. For the purposes of the present invention, it is assumed that whenever multicast SVC connections are established, enough connections are established to provide duplex communications.

The present invention encompasses two methods for establishing the connections. In the first method, the controller establishes the connections; in the second method, the controller instructs the sites to establish the connections. Regarding the first method, the controller first determines whether the talkgroup indicated by the affiliation message is already affiliated with the first site. If so, connections corresponding to the talkgroup already exist between the sites. If not, the controller affiliates the talkgroup with the site and then determines that the talkgroup is affiliated with the second site. If the talkgroup is not affiliated with the second site (but only the first site), there is no need for a connection between sites. However, if the talkgroup is affiliated with the second site (per a previous affiliation message as in step 201), then the connection is established. To this end, the controller requests the multicast SVC connections from the packet network. As noted above, the resulting connections will comprise enough unidirectional connections to establish duplex communication between the first and second sites.

In order to affiliate any site with the talkgroup, the controller can use an entry in a table stored in memory.

Additionally, the controller adds the multicast SVC identifiers subsequently established to each relevant table entry. An example of such a table is illustrated in Table 1.

TABLE 1

| Talk Group | Multicast SVC | Site IDs |
|---|---|---|
| A | M1 | 1, 4, 6 |
| B | M2 | 2, 7 |
| C | M3 | 1 |

Each of the multicast SVCs (M1–M3) shown in Table 1 comprise a plurality of unidirectional connections such that each of the sites is provided duplex communications with each of the other sites. Using the example of Table 1, it can be seen that talkgroup "A" is affiliated with sites 1, 4, and 6; that talkgroup "B" is affiliated with sites 2 and 7; and that talkgroup "C" is affiliated with site 1. Thus, with respect to talkgroup "A", for example, the multicast SVC labeled M1 comprises enough unidirectional multicast SVC connections such that sites 1, 4 and 6 have duplex capability between each other.

In constructing the entries of the table, the controller continually updates existing entries as new talkgroup/site affiliations are created. Assuming, for example, that talkgroup "C" became affiliated with site 5, an additional entry is made with the talkgroup "C"/site 5 affiliation and the corresponding multicast SVC identification M3.

Where a talkgroup is affiliated with two or more sites, it necessarily follows that packetized information for a given talkgroup should be replicated to all other sites affiliated with that talkgroup. This is reflected in Table 1. For example, packets corresponding to talkgroup "A"/site 1 are to be replicated by site 1 on to sites 4 and 6 via multicast SVC M1. However, packets received for talkgroup "C" at site 1 do not need to be replicated because there are no other entries for talkgroup "C", indicating that the talkgroup is currently represented in only one site.

Although not shown as part of Table 1, the controller also maintains information regarding which communication units are associated with a given talkgroup at a particular site. Thus, when an affiliation message is received, the communication unit ID associated with that affiliation message is added to a list of units for the talkgroup currently within the coverage are of the given site. In this manner, the controller can determine the number of communication units within a site that are associated with a particular talkgroup.

It is understood that other implementations of the table used by the controller are available. At a minimum, any implementation of the controller table must associate the one or more talkgroup/site affiliations with the corresponding multicast SVC for that talkgroup.

Continuing with the first method in which the controller establishes the connections, step 202 includes the controller informing the first and second sites of the connections. (In practice, control connections, such as SVCs or PVCs, between the controller and the sites are established when the system is first set up.) In particular, the controller sends the first and second sites the talkgroup and site IDs as well as the multicast SVC identifiers (i.e., identifiers of the multiple multicast SVCs used to establish duplex communications) so that the first and second site can each reproduce the table used by the controller, e.g., Table 1. In reproducing the controller's table, the first and second sites are effectively notified that they should route packets of information received from a given talkgroup to the corresponding multicast SVC listed in the table. At this point, the connections needed for any subsequent group communications for any given talkgroup have been pre-established via the packet network. By using affiliation messages to pre-establish connections prior to a communication request, the present invention avoids unacceptable delays that would be incurred if the connections were established only when a communication request is received.

Regarding the second method for establishing connections at step 202, the controller instructs the first and second sites to establish the connections with each other. As in the first method, the controller first determines whether connections between the first and second sites already exist. If not, rather than requesting the connections itself, the controller instructs the first and second sites to create the connections. The process of creating in the controller and the first and second sites a table functionally similar to Table 1 is essentially the same, except that the first and second sites inform the controller of the connections once they are established.

At step 203, the controller determines if a subsequent affiliation message has been received from a third site. For example, as shown in FIG. 1, a second communication unit 114 (assumed to be a member of the same talkgroup as the first communication unit 113) roams into a third site 106 and transmits an affiliation message. If such a subsequent affiliation message is received, the third site forwards it to the controller at step 204.

Responsive to the subsequent affiliation message, at step 205, the controller modifies the connection between the first and second sites to include the third site. This is accomplished through the use of an "add leaf" or "add peer" command into the packet network, as known in the art. In order to modify the connection, the controller first determines that the talkgroup is not yet affiliated with the third site, i.e., the subsequent affiliation message received at step 204 is the first time relative to the current state of the system that the talkgroup has been affiliated with the third site. Assuming that the talkgroup is not yet affiliated with the third site, the controller makes the talkgroup/site affiliation (e.g., in its internal affiliation tables). After making the talkgroup/site affiliation, the controller determines if the talkgroup is now affiliated with at least two sites. If the talkgroup is only affiliated with a single site at this point, then there is no need to modify a multicast SVC because one will not have been created yet. If the talkgroup is now affiliated with at least two sites, then a multicast SVC exists and can be modified to include the third site.

Regardless whether a subsequent affiliation message was not received at step 203 or if the connection has been modified at step 205, it is determined, at step 206, whether any site has received a communication request. The communication request specifies a talkgroup to be included in the call. In practice, such a determination is made at the sites (including a console site). Assuming that a communication request is received at a site (the receiving site) of the sites currently affiliated with the talkgroup, the communication request is forwarded to the controller.

At step 207, the receiving site receives packetized information from the communication unit or console that originally sourced the communication request. The packetized information is then forwarded by the receiving site, via the multicast SVC connection, to non-receiving sites of the sites currently affiliated with the talkgroup. Simply stated, non-receiving sites are all sites currently affiliated with a talkgroup other than the receiving site. For this reason, the identities of the receiving and non-receiving sites are constantly changing. Packetized information and the various methods for handling it within a packet network environment are well known in the art.

To illustrate, using Table 1, a communication request specifying talkgroup "A" is received at site 1, thereby designating site 1 as the receiving site. When packetized information corresponding to talkgroup "A" is received by site 1, site 1 forwards the packetized information to non-receiving sites 4 and 6. Because the multicast SVC is capable of performing a one-to-many conveyance of information, the need for a multicast server found in prior art techniques is eliminated.

Figure 3:
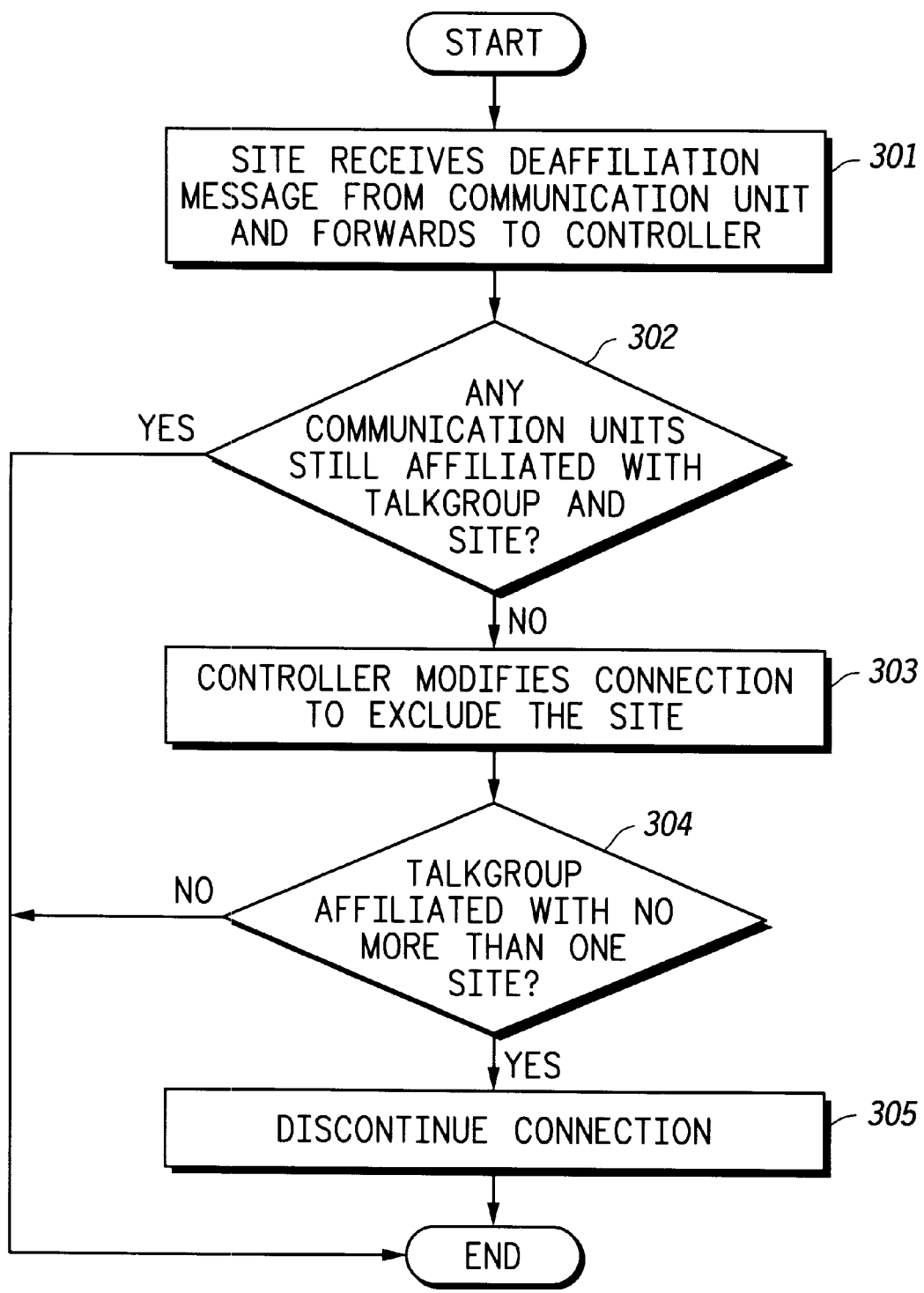
FIG. 3 is a flowchart illustrating a method for processing a deaffiliation message.

FIG. 3 is a flowchart illustrating a method for processing a deaffiliation message. At step 301, a site receives a deaffiliation message from a communication unit within the site's coverage area. The deaffiliation message is then forwarded to the controller. As known in the art, the deaffiliation message results when a communication unit undergoes a deaffiliation event, i.e., switches from a current talkgroup to a different talkgroup, affiliates with another site, or powers down. At a minimum, the deaffiliation message includes the identification of the communication unit and the identification of the talkgroup currently selected by the unit.

Upon receiving the deaffiliation message, the controller, at step 302, determines whether any communication units for the associated talkgroup (i.e., the talkgroup prior to the deaffiliation event) are still affiliated with the site. As described above, the controller maintains information regarding the identities, and hence the number, of communication units affiliated with a given talkgroup and site. If there are still communication units affiliated with the site and monitoring the talkgroup affected by the deaffiliation event, the previously established connections (i.e., multicast SVC) could still be needed in the future; therefore they are not discontinued.

If there are no more communication units affiliated with the talkgroup and the site, the controller modifies the connection to exclude the site. This is accomplished through the use of a "delete leaf" or "delete peer" command into the packet network, as known in the art. Additionally, the controller would update its own tables. For example, referring to Table 1, if the controller determines that there are no longer any communication units affiliated with talkgroup "A" at site 4, then the controller would delete site 4 from the talkgroup "A" entry.

At step 304, the controller determines whether the talkgroup identified in the deaffiliation message is currently affiliated with no more than one site. If so, then there is no need for the multicast SVC connections between sites and, at step 305, the connections would be discontinued by the controller.

For example, again with reference to Table 1, if site 2 is no longer affiliated with talkgroup "B", and was consequently excluded from multicast SVC M2, only site 7 would be left affiliated with talkgroup "B". As a result, multicast SVC M2 would no longer be needed and therefore discontinued.

The present invention provides a method for pre-establishing communications within a wireless communication network such that the use, and additional delays, of a multicast server are substantially eliminated. This is achieved by pre-establishing communications upon reception of affiliation messages, rather than communication requests. Furthermore, the use of multicast SVCs accomplishes the one-to-many functionality formerly embodied by a multicast server. In this manner, the present invention avoids network setup delays that can extend into hundreds of milliseconds. Consequently, the perceived user delay in call setup and processing is correspondingly minimized.

We claim:

1. In a wireless communication system comprising a controller, a plurality of sites, and a plurality of communication units arranged into a plurality of talkgroups, wherein a first communication unit of the plurality of communication units, upon coming in range of a first site of the plurality of sites, affiliates with the first site and also with a talkgroup of the plurality of talkgroups, and wherein the plurality of sites and the controller are linked together by a packet network, a method for the controller to pre-establish communications between the first site and a second site of the plurality of sites, the method comprising steps of:
    a) receiving, by the controller from the first site, an affiliation message when the first communication unit affiliates with the first site and the talkgroup; and
    b) establishing, responsive to the affiliation message, connections between the first site and the second site via the packet network.

2. The method of claim 1, step (b) further comprising the step of establishing the connections between the first site and the second site, wherein the connections comprises a multicast switched virtual circuit.

3. The method of claim 2, step (b) further comprising the step of establishing the connections between the first site and the second site by the controller.

4. The method of claim 3, step (b) further comprising steps of:
    at the controller, prior to establishing the connections:
        b1) determining that the talkgroup is not yet affiliated with the first site;
        b2) affiliating the talkgroup with the first site; and
        b3) determining, subsequent to the step of affiliating, that the talkgroup is affiliated with the first site and the second site.

5. The method of claim 4, further comprising steps of:
    at the controller:
        c) receiving, from a third site of the plurality of sites, a subsequent affiliation message when a second communication unit affiliates with the third site and the talkgroup; and
        d) modifying, responsive to the subsequent affiliation message, the connections between the first site and the second site to include the third site.

6. The method of claim 5, step (d) further comprising steps of:
    at the controller, prior to modifying the connections:
        d1) determining that the talkgroup is not yet affiliated with the third site;
        d2) affiliating the talkgroup with the third site; and
        d3) determining, subsequent to the step of affiliating, that the talkgroup is affiliated with at least two sites of the plurality of sites.

7. The method of claim 4, further comprising steps of:
    at a receiving site of at least the first and second sites:
        c) receiving packetized information from a communication unit; and
        d) forwarding the packetized information to non-receiving sites of the at least the first and second sites via the connections.

8. The method of claim 2, step (b) further comprising the step of establishing the connections between the first site and the second site, wherein the controller instructs the first site and the second site to establish the connections.

9. The method of claim 8, step (b) further comprising steps of:
    at the controller, prior to establishing the connections:
        b1) determining that the talkgroup is not yet affiliated with the first site;
        b2) affiliating the talkgroup with the first site; and
        b3) determining, subsequent to the step of affiliating, that the talkgroup is affiliated with the first site and the second site.

10. The method of claim 9, further comprising steps of:
    at the controller:
        c) receiving, from a third site of the plurality of sites, a subsequent affiliation message when a second communication unit affiliates with the third site and the talkgroup; and
        d) modifying, responsive to the subsequent affiliation message, the connections between the first site and the second site to include the third site.

11. The method of claim 10, step (d) further comprising steps of:
    at the controller, prior to modifying the connections:
        d1) determining that the talkgroup is not yet affiliated with the third site;
        d2) affiliating the talkgroup with the third site; and
        d3) determining, subsequent to the step of affiliating, that the talkgroup is affiliated with at least two sites of the plurality of sites.

12. The method of claim 9, further comprising steps of:
    at a receiving site of at least the first and second sites:
        c) receiving packetized information from a communication unit; and
        d) forwarding the packetized information to non-receiving sites of the at least the first and second sites via the connections.

13. The method of claim 2, further comprising steps of:
    at the controller:
        c) receiving a deaffiliation message from a site of the first, second and third sites, wherein the deaffiliation message is sent by a communication unit;
        d) determining, responsive to the deaffiliation message, that no communication units are affiliated with the talkgroup and the site; and
        e) modifying, responsive to the deaffiliation message, the connections to exclude the site.

14. The method of claim 13, further comprising steps of:
    at the controller:
        f) determining, responsive to the deaffiliation message, that the talkgroup is affiliated with no more than a single site of the plurality of sites; and
        g) discontinuing the connections.

* * * * *

UNITED STATES PATENT AND TRADEMARK OFFICE
CERTIFICATE OF CORRECTION

PATENT NO. : 6,157,843
DATED : December 5, 2000
INVENTOR(S) : DeRango, et al.

Page 1 of 1

It is certified that error appears in the above-identified patent and that said Letters Patent is hereby corrected as shown below:

On title page,

Inventor's name should be --DeRango--, not "Derango"

Signed and Sealed this

Fifth Day of June, 2001

Attest:

Attesting Officer

NICHOLAS P. GODICI
Acting Director of the United States Patent and Trademark Office